United States Patent
Moravek et al.

(10) Patent No.: US 9,018,327 B1
(45) Date of Patent: Apr. 28, 2015

(54) CATALYST COMPOSITIONS AND METHODS OF PREPARING THEM

(71) Applicant: PPG Industries Ohio, Inc., Cleveland, OH (US)

(72) Inventors: Scott Moravek, Cranberry Township, PA (US); Davina Schwartzmiller, Rural Valley, PA (US); Steven V. Barancyk, Wexford, PA (US); David Fenn, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 42 days.

(21) Appl. No.: 14/075,204

(22) Filed: Nov. 8, 2013

(51) Int. Cl.
| | |
|---|---|
| C08F 20/06 | (2006.01) |
| C08F 118/02 | (2006.01) |
| B01J 31/00 | (2006.01) |
| C08G 63/48 | (2006.01) |
| C09D 201/00 | (2006.01) |

(52) U.S. Cl.
CPC .................................. C09D 201/00 (2013.01)

(58) Field of Classification Search
CPC ............ C09D 5/1631; C08G 18/0823; C08G 18/6254
USPC ................... 526/317.1, 319; 502/153; 525/11
See application file for complete search history.

(56) References Cited

U.S. PATENT DOCUMENTS

| | | | |
|---|---|---|---|
| 3,963,680 | A | 6/1976 | O'Keefe et al. |
| 4,252,708 | A | 2/1981 | Newell |
| 5,726,456 | A | 3/1998 | Lupton et al. |
| 6,013,698 | A | 1/2000 | Lupton et al. |
| 6,262,152 | B1 | 7/2001 | Fryd et al. |
| 2005/0234194 | A1 | 10/2005 | Saiga et al. |
| 2007/0173602 | A1 | 7/2007 | Brinkman et al. |
| 2008/0182943 | A1 | 7/2008 | Goetter et al. |
| 2011/0002831 | A1 | 1/2011 | Arfsten et al. |
| 2011/0104495 | A1 | 5/2011 | Lalgudi et al. |
| 2011/0236498 | A1 | 9/2011 | Marteaux et al. |
| 2012/0199671 | A1 | 8/2012 | De Schrijver et al. |
| 2013/0017405 | A1 | 1/2013 | Benkoski et al. |
| 2013/0085222 | A1 | 4/2013 | Fasano et al. |

FOREIGN PATENT DOCUMENTS

| | | | |
|---|---|---|---|
| CA | 2341977 | | 2/2001 |
| GB | 1201902 | A | 8/1970 |
| GB | 1482545 | A | 8/1977 |
| JP | 2983234 | B2 | 11/1999 |
| JP | 2001048903 | B1 | 2/2001 |
| JP | 4102274 | B | 3/2008 |
| WO | 90/02655 | A1 | 3/1990 |
| WO | WO 90/02655 | * | 3/1990 |
| WO | 20121151357 | A2 | 11/2012 |
| WO | 20121151409 | A2 | 11/2012 |

OTHER PUBLICATIONS

Carlton et al., "Microencapsulated Catalyst and Energetic Compound Containing Same", United States Statutory Invention Registration No. H778, May 11, 1990, USA.

* cited by examiner

Primary Examiner — William Cheung
(74) Attorney, Agent, or Firm — Krisanne Shideler

(57) ABSTRACT

A catalyst composition is provided. The composition comprises at least 30 percent by weight of a catalyst compound based on the total weight of solids in the catalyst composition; and a polymer prepared from ethylenically unsaturated monomers. The polymer either (i) has a backbone derived from substantially hydrophilic monomers and/or monomers containing groups that may be rendered substantially hydrophilic after polymerization, and a plurality of side chains along the backbone derived from substantially hydrophobic monomers, or (ii) has a backbone derived from substantially hydrophobic monomers and a plurality of side chains along the backbone derived from substantially hydrophilic monomers and/or monomers containing groups that may be rendered substantially hydrophilic after polymerization. The catalyst compound is contained within or encapsulated by the polymer. Methods of preparing the catalyst composition and curable compositions containing the catalyst composition are also provided.

25 Claims, No Drawings

CATALYST COMPOSITIONS AND METHODS OF PREPARING THEM

FIELD OF THE INVENTION

The present invention is directed to additive compositions, in particular, catalyst compositions and methods of preparing them.

BACKGROUND OF THE INVENTION

Catalysis is a change in the rate of a chemical reaction due to the participation of a material called a catalyst. Catalysts that speed the reaction are called positive catalysts. Catalysts that slow the reaction are called negative catalysts, or inhibitors. Unlike reactants, a catalyst is not consumed by the reaction itself.

A catalyst works by providing an alternative reaction pathway to the reaction product. The rate of the reaction is increased when this alternative route has a lower activation energy than the reaction route not mediated by the catalyst. Catalysts can also enable reactions that would otherwise be blocked or slowed by a kinetic barrier. The catalyst may increase reaction rate or selectivity, or enable the reaction to proceed at lower temperatures than would otherwise be possible. As such, catalysts can be very valuable tools in industrial processes.

There can be drawbacks to the use of catalysts. For example, tin compounds are used extensively in Industrial products such as coatings, as catalysts for isocyanate/hydroxyl reactions. Unfortunately, often the catalyst levels required to provide acceptably fast cure rates and final product properties typically result in a short application time window after the components are mixed. Further improvements in reaction rate by adding additional catalyst are precluded because the pot life of the resulting compositions will be even shorter. It would be desirable to catalyze chemical reactions using methods and catalysts that overcome these drawbacks of the prior art by lengthening the pot life of the composition or by accelerating the reaction rate after application without adversely affecting the pot life.

SUMMARY OF THE INVENTION

In accordance with the present invention, a catalyst composition is provided. The composition comprises at least 30 percent by weight of a catalyst compound based on the total weight of solids in the catalyst composition; and a polymer prepared from ethylenically unsaturated monomers. The polymer either (i) has a backbone derived from substantially hydrophilic monomers and/or monomers containing groups that may be rendered substantially hydrophilic after polymerization and a plurality of side chains along the backbone derived from substantially hydrophobic monomers, or (ii) has a backbone derived from substantially hydrophobic monomers and a plurality of side chains along the backbone derived from substantially hydrophilic monomers and/or monomers containing groups that may be rendered substantially hydrophilic after polymerization. The catalyst compound is contained within or encapsulated by the polymer.

Methods of preparing the catalyst composition and curable compositions containing the catalyst composition are also provided. A particular method comprises:

i) polymerizing together one or more substantially hydrophobic, ethylenically unsaturated monomers to yield a substantially hydrophobic macromonomer having an ethylenically unsaturated end group that is polymerizable with other ethylenically unsaturated monomers;

ii) polymerizing together one or more substantially hydrophilic ethylenically unsaturated monomers, and/or monomers containing groups that are rendered substantially hydrophilic after polymerization, with the macromonomer formed in step i) to yield a polymer having a substantially hydrophilic backbone and a plurality of substantially hydrophobic side chains along the backbone;

iii) combining the polymer with an aqueous medium;

iv) optionally neutralizing any acid or base groups on the polymer;

v) dispersing the polymer into the aqueous medium;

vi) adding a catalyst compound to the aqueous medium; and vii) dispersing the catalyst compound into the aqueous medium. Note that two or more process steps, for example, two or more of the steps iii) to vii) or two or more of the steps i) to v) may be performed simultaneously or the order thereof may be otherwise altered without departing from the scope of the invention.

Also provided by the present invention is a method of preparing a catalyst composition dispersed in an aqueous medium, comprising:

i) polymerizing together one or more substantially hydrophilic, ethylenically unsaturated monomers, and/or monomers containing groups that may be rendered substantially hydrophilic after polymerization, to yield a substantially hydrophilic macromonomer having an ethylenically unsaturated end group that is polymerizable with other ethylenically unsaturated monomers;

ii) polymerizing together one or more substantially hydrophobic ethylenically unsaturated monomers with the macromonomer formed in step i) to yield a polymer having a substantially hydrophobic backbone and a plurality of substantially hydrophilic side chains along the backbone;

iii) combining the polymer with an aqueous medium;

iv) optionally neutralizing any acid or base groups on the polymer;

v) dispersing the polymer into the aqueous medium;

vi) adding a catalyst compound to the aqueous medium; and vii) dispersing the catalyst compound into the aqueous medium. Again, two or more of the steps iii) to vii) or two or more of the steps i) to v) may be performed simultaneously or the order thereof may be otherwise altered without departing from the scope of the invention.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about," even if the term does not expressly appear. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

Plural encompasses singular and vice versa; e.g., the singular forms "a," "an," and "the" include plural referents unless expressly and unequivocally limited to one referent. For example, where the invention has been described in terms of "a" polyisocyanate, a plurality, including a mixture of such compounds, can be used.

As used herein, the term "polymer" is meant to refer to prepolymers, oligomers and both homopolymers and copolymers; the prefix "poly" refers to two or more.

The catalyst composition of the present invention comprises a catalyst compound and a polymer prepared from ethylenically unsaturated monomers. The catalyst compound is contained within or encapsulated by the polymer. The polymer forms a carrier shell or encapsulant around the catalyst and contains the catalyst within its interior or core. Examples of suitable catalyst compounds include organo-metal compounds such as hafnium, titanium, tin, zinc, bismuth, aluminum, and zirconium compounds. Exemplary tin compounds include trialkyl- and triaryltin halides, acetates, hydroxides, and related compounds, Dibutyltin dilaurate (DBTL), Dibutyltin diacetate (DBTA), Dibutyltin sulphide (DBTS), Dibutyltin maleate (DBTM), Dibutyltin-2-ethylhexanoate (DBTEH), Dibutyltin-dlneodecanoate (DBTND), Dibutyltin dichloride (DBTCl), Dibutyltin oxide (DBTO), Monobutyitin trichloride (MBTCI), Monobutyltin oxide (MBTO), Dioctyltin dilaurate (DOTL), Dioctyltin diacetate (DOTA), Dioctyltin sulphide (DOTS), Dioctyttin maleate (DOTM), Dioctyltin-2-ethyihexanoate (DOTEH), Dioctyltin-dineodecanoate (DOTND), Dioctyltin dichloride (DOTCI), Dioctyltin oxide (DOTO), Monooctyltin trichloride (MOTCI), Monooctyltin oxide (MOTO), alkylated phosphines, amines such as 1,8-Diazabicyclo-undec-7-ene (DBU) and Barton's base, methyl dicocoamine, and the like. The catalyst compound is present in the catalyst composition in an amount of at least 30 percent by weight, often at least 40 percent by weight, or at least 50 percent by weight, or even at least 60 percent by weight, based on the total weight of solids in the catalyst composition, as demonstrated in the examples below. The use of catalyst compositions at these loading levels minimizes the amount of the catalyst composition that needs to be added to a reaction mixture such as a curable film-forming composition, and thus maximizes overall formulation latitude.

The polymer used in the catalyst composition of the present invention is prepared from ethylenically unsaturated monomers. In certain embodiments, the polymer has a backbone derived from substantially hydrophilic monomers and/or monomers containing groups that may be rendered substantially hydrophilic after polymerization, and a plurality of side chains along the backbone derived from substantially hydrophobic monomers. In alternative embodiments, the polymer has a backbone derived from substantially hydrophobic monomers and a plurality of side chains along the backbone derived from substantially hydrophilic monomers and/or monomers containing groups that may be rendered substantially hydrophilic after polymerization. By "substantially hydrophilic" is meant that the monomers or repeat units in the resulting polymer have polar properties and have a tendency to interact with, be miscible with, or be dissolved by water and other polar substances. In embodiments including acid functional monomers, the substantially hydrophilic monomers may be selected so as to provide the resulting polymer with an acid value of at least 45 mg KOH/g resin, such as at least 60 mg KOH/g resin, or at least 125 mg KOH/g resin, based on the total weight of resin solids of the polymer. Suitable substantially hydrophilic monomers include one or more of methoxypolyethylene glycol (meth)acrylate, (meth) acrylic add, crotonic acid, itaconic acid, maleic acid and fumaric acid. Hydroxyl functional ethylenically unsaturated monomers may be used, such as hydroxyalkyl acrylates and methacrytates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as other beta-hydroxy ester functional monomers. In typical embodiments of the present invention, the polymer is essentially free of hydroxyl functional groups and hydroxyl functional monomers are not used to prepare either portion of the polymer.

By "essentially free" of a material is meant that a composition has only trace or incidental amounts of a given material, and that the material is not present in an amount sufficient to affect any properties of the composition.

Other suitable substantially hydrophilic monomers include amine functional ethylenically unsaturated monomers such as dimethylaminoethyl (meth)acrylate, diethylaminoethyl (meth)acrylate, and the like. Protonated (cationic) derivatives of these monomers may also be used. As noted above, monomers containing groups that may be rendered substantially hydrophilic after polymerization may also be used to form the hydrophilic portion of the polymer. For example, epoxy functional ethylenically unsaturated monomers such as glycidyl methacrylate and the like may be used to form the macromonomer or the polymer backbone, and then epoxy functional groups on the resulting polymer may be post-reacted with a compound such as an amino alcohol using known methods to render the polymer more hydrophilic.

Usually about 6 to 16 percent by weight, often 8 to 10 percent by weight of an acid functional monomer (based on the total weight of monomers used to prepare the entire polymer) is used to prepare the hydrophilic portion of the polymer, with the balance of the reaction mixture used to prepare the hydrophilic portion of the polymer comprising, for example, 25-35 percent by weight styrene and 35-50 percent by weight ethyl acrylate (also based on the total weight of monomers used to prepare the entire polymer, i.e., both hydrophilic and hydrophobic portions).

By "substantially hydrophobic" is meant that the monomers have non-polar properties and have a tendency to interact with, be miscible with, or be dissolved by non-polar solvents such as alkanes and oils. Suitable substantially hydrophobic monomers include one or more of n-butyl (meth)acrylate, Isobutyl (meth)acrylate, lauryl (meth)acrylate, 2-ethylhexyl (meth) acrylate, stearyl (meth) acrylate, and styrene. A typical reaction mixture of hydrophobic monomers comprises 60 percent by weight n-butyl acrylate, 25 percent by weight lauryl methacrylate, and 15 percent by weight n-butyl methacrylate, based on the total weight of monomers used to prepare the hydrophobic portion of the polymer. Monomers such as styrene, ethyl acrylate and methyl methacrylate may be used in combination with the hydrophobic and/or hydrophilic monomers in the making of either portion of the polymer, as noted above.

In preparing the catalyst composition of the present invention, a polymer is first prepared by (i) polymerizing together one or more substantially hydrophobic, ethylenically unsaturated monomers, to yield a substantially hydrophobic macromonomer having an ethylenically unsaturated end group that is polymerizable with other ethylenically unsaturated monomers. Polymerization preferably takes place in a continuous stir tank reactor. In particular embodiments, this polymerization takes place at a temperature of 170° to 300° C., usually 210° to 240° C.

The ethylenically unsaturated end group allows the macromonomer to be further polymerized with additional ethylenically unsaturated monomers by addition polymerization. The macromonomer is (ii) polymerized with one or more substantially hydrophilic monomers, and/or monomers containing groups that may be rendered substantially hydrophilic after polymerization, to form a polymer having a substantially hydrophilic backbone and a plurality of substantially hydrophobic side chains along the backbone. In alternative embodiments of the invention, a polymer having a substantially hydrophobic backbone and a plurality of substantially hydrophilic side chains along the backbone may be prepared by reversing the monomers used in each polymerization step ((i) and (ii)) of the process described above.

In particular embodiments of the present invention, for example, when the catalyst is an organo-metal catalyst such as dibutyltin dilaurate, the polymer prepared from the process steps described above typically demonstrates a glass transition temperature ($T_g$) less than 15° C., usually 12° C. or less. The $T_g$ as indicated herein is the extrapolated endpoint glass transition temperature ($T_{gE}^E$) as defined in standard DIN 53765 using a dried sample of the resin, determined by differential scanning calorimetry at a heating rate of 10° C./minute from −90 to 175° C.

The catalyst composition of the present invention may be dispersed in an aqueous medium, such as an aqueous medium comprising at least 20 percent by weight water, more often at least 50 percent by weight water.

After the polymerization steps described above, subsequent process steps may be performed or combined in a variety of ways. They may be performed sequentially in the order listed, or the order may be altered. Two or more of the subsequent process steps may be performed simultaneously. In an exemplary process the following steps may be performed in place of steps iii) to vii) above:

iii-a) either separately or concurrently A) neutralizing any acid or base groups, if desired, on the polymer and B) dispersing the polymer in a substantially aqueous medium to form a polymer dispersion;

iv-a) adding a catalyst compound to the polymer dispersion; and v-a) dispersing the catalyst compound into the polymer dispersion to form a dispersed catalyst composition comprising the catalyst compound contained within or encapsulated by the polymer.

Furthermore, it will be appreciated that step iii-a) can be accomplished by either a "direct thin", in which water is added to the polymer, or by a "reverse thin" in which the polymer is added to water. In either case, the neutralizing agent (if used) can be added to the polymer first, or can be added to the water, in which case the polymer is neutralized and dispersed simultaneously.

In another embodiment the catalyst and polymer are dispersed simultaneously; i.e., the catalyst composition of the present invention may be dispersed in an substantially aqueous medium by the following steps:

iii-b) optionally first neutralizing acid or base groups, if present, on the polymer;

iv-b) adding a catalyst compound to the polymer to form a mixture;

v-b) either separately or concurrently A) neutralizing acid or base groups on the polymer (if acid or base groups present on the polymer are not neutralized in step iii-b) and it is desired to do so), and B) co-dispersing the polymer and catalyst simultaneously in a substantially aqueous medium to form a dispersed catalyst composition comprising the catalyst compound contained within or encapsulated by the polymer.

As above, step v-b) can be accomplished by either a "direct thin", in which water is added to the polymer, or by a "reverse thin" in which the polymer is added to water. In either case, the neutralizing agent can be added to the polymer first, or can be added to the water, in which case the polymer is neutralized and dispersed simultaneously.

In both embodiments, it will be further understood by those skilled in the art that if the polymer comprises only non-acid or non-base hydrophilic groups, i.e. "non-ionic" hydrophilic groups such as hydroxyl groups or ether functional groups, neutralization is not required.

Neutralization of acid groups on the polymer is not necessary, but is usually performed and may be done in whole or in part using, for example, Inorganic bases such as ammonium hydroxide or amines such as dimethylethanolamine, diisopropanolamine, triethylamine, and the like. Neutralization of base groups likewise is not necessary, but is usually performed and may be done in whole or in part using, for example, Inorganic acids such as HCl or organic acids such as acetic acid, propionic acid, lactic acid, and the like.

Effective dispersion techniques may include high shear mixing such as by homogenization, emulsification by use of an emulsifier such as a MICROFLUIDIZER® emulsifier which is available from Microfluidics Corporation in Newton, Mass., use of rotor/stator mixers, Cowles dispersers, or mixing a small volume of material with a conventional stirrer at a high agitation rate, such as illustrated in the examples. Dispersion promotes the encapsulation of the catalyst compound by the polymer.

In alternative embodiments of the present invention, two or more of the steps i) to v) may be performed simultaneously, such as when the polymerization steps are conducted in an aqueous medium.

Average particle sizes of the dispersed catalyst compositions are usually less than 1000 nm, such as less than 500 nm. Exemplary average particle sizes of the dispersed catalyst compositions include Z average mean, number average, and volume average mean particle sizes of 240 to 280 nm, 200 to 260 nm, and 200 to 260 nm, respectively.

In addition, the dispersed catalyst compositions prepared in either embodiment previously described can optionally be subjected to further reaction by conducting in their presence a polymerization process, such as an emulsion polymerization process. Examples of emulsion polymerization include free radical polymerization processes and polyurethane formation. Any monomers and initiators known in the art for these processes can be used. Not wishing to be bound by theory, it is believed that this process will result in a polymer that will reside with the catalyst compound inside the initial dispersed polymer, with the effect of "entangling with" or otherwise entraining the catalyst compound and further slowing its release.

The present invention is also drawn to curable compositions. These compositions may be solventborne or waterborne. The curable compositions typically comprise (a) a reaction mixture and (b) the catalyst composition described above. Additionally, in certain embodiments, the reaction mixture (a) may be a powder or liquid curable composition and may be cast, extruded, rolled, or applied to a substrate as a coating or laminated film. The reaction mixture may also yield a transparent reaction product, suitable for use as a free film, display screen, window (glazing), windshield, lens, and the like. The reaction mixture (a) comprises i) one or more resins having reactive functional groups that are reactive with themselves or with functional groups on ii) a separate crosslinking agent. The components i) and ii) may be provided as a one- (1K) or multi-package, such as a two-package (2K) system. The components of the reaction mixture are often provided in separate packages and mixed together immediately prior to the reaction. When the reaction mixture is a multi-package system, the catalyst composition (b) may be present in either one or both of the separate components i) and ii) and/or as an additional separate component package.

In certain embodiments of the present invention the reaction mixture (a) may comprise i) a polyol and ii) a polyisocyanate. Such reaction mixtures are commonly used to form curable film-forming compositions.

Suitable polyols i) include solventborne and waterborne resinous polyols such as acrylic, polyester, polyether, alkyd, and polyurethane polyols as known in the art.

Suitable polyisocyanates include diisocyanates and triisocyanates such as biurets and isocyanurates. Biurets of any suitable diisocyanate including 1,4-tetramethylene diisocyanate and 1,6-hexamethylene diisocyanate may be used as reactant i) a) in the method of the present invention. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmeta-xylylene diisocyanate. The diisocyanates themselves may also be used as component ii) in the curable compositions of the present invention.

Trifunctional isocyanates may also be used as component ii), for example, trimers of isophorone diisocyanate, triisocyanato nonane, triphenylmethane triisocyanate, 1,3,5-benzene triisocyanate, 2,4,6-toluene triisocyanate, an adduct of trimethylol propane and tetramethyl xylene diisocyanate sold under the trade name CYTHANE 3160 by CYTEC Industries, and DESMODUR N 3300, which is the isocyanurate of hexamethylene diisocyanate, available from Bayer Corporation. Polyisocyanates often used in curable compositions include cyclic isocyanates, particularly, isocyanurates of diisocyanates such as hexamethylene diisocyanate and isophorone diisocyanate.

The isocyanate-functional material used as component ii) may also be one of those disclosed above, chain extended with one or more polyamines and/or polyols using suitable materials and techniques known to those skilled in the art.

In the curable compositions of the present invention, adding the catalyst to the reaction mixture may cause the curing reaction to proceed at a temperature lower than would be required without the use of the catalyst. Also, the reaction may occur faster at a given temperature than would otherwise be observed between the particular reactants. Reactions may be conducted at ambient temperature or at elevated temperatures, such as greater than 30° C., depending on the chemistries involved.

Pot life is herein defined as the span of time during which a coating is ready to apply (for example, because all components have been combined) and still of low enough viscosity to be applied. For other curable compositions, pot life is the span of time during which a curable composition is ready to be molded, cast, or extruded (for example, because all components have been combined) and still of low enough viscosity to be molded, cast, or extruded. Coating compositions comprising the encapsulated catalyst compositions of the present invention show an extension in pot life compared to curable compositions comprising the same amount of catalyst in unencapsulated form, but still cure within an acceptable time after application. This improvement in working time can be advantageous during application of the coating composition. Alternatively, the encapsulated catalyst compositions of the present invention may allow the use of higher catalyst levels, resulting in shorter cure times and increased work throughput, but with a pot life comparable to lower loadings of unencapsulated catalysts. This may be desirable in many situations, e.g. in application of automotive refinish coatings.

The catalyst composition is used in an amount sufficient to enable or accelerate reaction of any reactive functional groups in the reaction mixture. The amount may vary based on the chemistry of the reactants involved, but typically the amount of catalyst composition used in the curable compositions of the present invention is 0.01 to 10 percent by weight, often 0.05 to 5 percent by weight, typically less than 3 percent by weight, such as 0.09 percent by weight, based on the total weight of resin solids in the reaction mixture.

The present invention will further be described by reference to the following examples. The examples are merely illustrative of the invention and are not intended to be limiting. Unless otherwise indicated, all parts are by weight.

EXAMPLES

The following examples are presented to demonstrate the general principles of the invention. Example 1 describes the preparation of a macromonomer which is subsequently used in the synthesis of a dispersible co-polymer. Examples 2 and 2A describe the preparation of a co-polymer with the macromonomer described in Example 1. Example 2B describes the preparation of an aqueous dispersion of the co-polymer of Example 2A. Examples 3 and 4 describe two methods of dispersing a catalyst into the macromonomer co-polymer and Example 5 describes a further modification of the catalyst dispersion from Example 4. All amounts listed are described in parts by weight, unless otherwise indicated. The invention should not be construed as limited to the specific examples presented.

Example 1

An acrylic macromonomer was prepared in a 300 ml continuous stir tank reactor (CSTR) system from the following ingredients:

| Ingredient | Wt. in g |
|---|---|
| Butyl acrylate | 2406.4 |
| Lauryl metliacrylate | 1002.6 |
| Butyl methacrylate | 601.5 |
| Di-t-amyl peroxide | 20.05 |

The CSTR was charged with 300 mL of 2-butoxyethanol. The above ingredients were weighed and stirred for 15 minutes at an agitation rate sufficient to provide good mixing, then charged to a feed tank while the reactor system was heating up to the reaction temperature (235° C.). When the system was at temperature, the monomer/Initiator charge to the reactor was begun at a rate of 60 mL/min. Collection of the resulting acrylic macromonomer was begun 18 minutes after the feed was begun (3.6 CSTR residence times, a time sufficient to clear the 2-butoxyethanol charge from the system), and continued for 60 minutes A reactor temperature of 235° C. and a pressure of 450-460 psig were maintained throughout the polymerization. The resulting material was a viscous but pourable liquid with a $M_w$ of 3600, a $M_n$ of 1590, a $P_d$ of 2.3, and a peak MW of 2668 as determined by gel permeation chromatography versus a polystyrene standard.

Example 2

An acrylic macromonomer co-polymer was prepared from the following ingredients:

| Ingredient | Wt. in g |
|---|---|
| Charge 1 | |
| Acrylic macromonomer of Ex. 1 | 1000.0 |
| Dipropylene glycol monomethyl ether | 550.0 |
| Propylene glycol monomethyl ether | 550.0 |
| Charge 2 | |
| LUPEROX 7M50[1] | 300.0 |
| Dipropylene glycol monomethyl ether | 50.0 |
| Propylene glycol monomethyl ether | 50.0 |
| Charge 3 | |
| Acrylic acid | 400.0 |
| Styrene | 1500.0 |
| Ethyl acrylate | 2100.0 |
| Charge 4 | |
| Dipropylene glycol monomethyl ether | 25.0 |
| Propylene glycol monomethyl ether | 25.0 |
| Charge 5 | |
| Dipropylene glycol monomethyl ether | 25.0 |
| Propylene glycol monomethyl ether | 25.0 |
| Charge 6 | |
| Luperox 7M50 | 50.0 |
| Dipropylene glycol monomethyl ether | 12.5 |
| Propylene glycol monomethyl ether | 12.5 |
| Charge 7 | |
| Dioropylene glycol monomethyl ether | 25.0 |
| Propylene glycol monornethyl ether | 25.0 |

[1]t-butyl peroxyacetate, 50% solution in OMS, available from Arkema, Inc.

Charge 1 was added to a reactor equipped with a stirrer, thermocouple, and condenser, and $N_2$ inlet. An $N_2$ blanket was applied and the reaction mixture was heated to reflux. Charge 2 was added over 255 minutes; 5 minutes after Charge 2 was begun, Charge 3 was begun over 240 minutes. Charges 4 and 5 were then added as rinses for Charges 3 and 2 respectively upon completion. After the addition of Charge 5, the reaction mixture was held at temperature for 60 minutes. Charge 6 was then added over 30 minutes, with Charge 7 added as a rinse. The reaction mixture was then held for 60 minutes. The resulting material was a clear, viscous resin with a solids (110° C., 1 hr) of 78.24%, an add value of 42.9 mg KOH/g resin solution, and a Mw of 25453, a $M_n$ of 5587, a Pd of 4.6 and a peak MW of 11427 as determined by gel permeation chromatography versus a polystyrene standard. The extrapolated endpoint glass transition temperature ($T_{gE}^E$) as defined in standard DIN 53765 of a dried sample of the resin was determined by differential scanning calorimetry at a heating rate of 10° C./minute from −90 to 175° C. to be 12° C. from the first heat and 8° C. from the second heat.

Example 2A

An acrylic macromonomer co-polymer was prepared from the following ingredients:

| Ingredient | Wt. in g |
|---|---|
| Charge 1 | |
| Acrylic macromonomer of Ex. 1 | 200.0 |
| Dipropylehe glycol monomethyl ether | 140.0 |
| Charge 2 | |
| LUPEROX 7M50[1] | 60.0 |
| Dipropylene glycol monomethyl ether | 20.0 |
| Charge 3 | |
| Acrylic add | 80.0 |
| Styrene | 300.0 |
| Ethyl acrylate | 420.0 |
| Charge 4 | |
| Dipropylene glycol monomethyl ether | 10.0 |
| Charge 5 | |
| Dioropylene glycol monomethyl ether | 10.0 |
| Charge 6 | |
| Luperox 7M50 | 10.0 |
| Dipropylene glycol monomethyl ether | 5.0 |
| Charge 7 | |
| Dipropylene glycol mono ethyl ether | 5.0 |

Charge 1 was added to a reactor equipped with a stirrer, thermocouple, and condenser, and $N_2$ inlet. An $N_2$ blanket was applied and the reaction mixture was heated to reflux. Charge 2 was added over 135 minutes; 5 minutes after Charge 2 was begun, Charge 3 was begun over 120 minutes. Charges 4 and 5 were then added as rinses for Charges 3 and 2 respectively upon completion. After the addition of Charge 5, the reaction mixture was held at temperature for 60 minutes. Charge 6 was then added over 30 minutes, with Charge 7 added as a rinse. The reaction mixture was then held for 60 minutes. The resulting material was a deer, viscous resin with an add value of 46.9 mg KOH/g resin solution, and a $M_w$ of 29261, a $M_n$ of 5348, a Pd of 5.5 and a peak MW of 11173 as determined by gel permeation chromatography versus a polystyrene standard.

Example 2B

An aqueous dispersion of an acrylic macromonomer co-polymer was prepared from the following ingredients:

| Ingredient | Wt. in g |
|---|---|
| Charge 1 | |
| Acrylic macromonomer co-polymer of Ex. 2A | 530.1 |
| Charge 2 | |
| Diionized $H_2O$ | 737.2 |
| Dimethylethanol amine | 14.50 |

Charge 1 was added to a 2 L round bottom flask equipped with a thermocouple, condenser, $N_2$ inlet and paddle blade stirrer, placed under an $N_2$ blanket, and heated to 90° C. Charge 2 was also heated to 90° C. At temperature, Charge 2 was added to the reactor with mixing over a period of 40 minutes. The mixture was then stirred for 60 minutes. The resulting dispersion was a thin white liquid, with a solids content (110° C., 1 hr) of 35.08%, and a viscosity (Brookfield #2 spindle, 100 rpm) of 69 cP. Particle size analysis (Malvem HPPS) showed a monomodal distribution with a Z average mean particle size of 163 nm and a polydispersity index of 0.399.

Example 3

The following ingredients were added to a 2.5 oz. glass jar (with a diameter of 1⅜ in. and height of 3⅛ in.): 30 g of macromonomer co-polymer dispersion from Example 2B and 15 g of DBTDL. The solution was stirred at 2000 rpm for 5 minutes using a high lift blade and bench top air powered stirrer.

Example 4

An aqueous dispersion of an acrylic macromonomer co-polymer and dibutyltin dilaurate was prepared from the following ingredients:

| Ingredient | Wt. in g |
| --- | --- |
| Charge 1 | |
| Acrylic macromonomer co-polymer of Ex. 2 | 253.9 |
| Charge 2 | |
| Dibutyltin dilaurate | 268.7 |
| Charge 3 | |
| Ammonium hydroxide (29% solution) | 17.07 |
| Charge 4 | |
| Deionized $H_2O$ | 34.01 |
| Charge 5 | |
| Deionized $H_2O$ | 726.44 |

Charge 1 was added to a 2 L round bottom flask equipped with a thermocouple, condenser, $N_2$ inlet and paddle blade stirrer, placed under an $N_2$ blanket, and heated to 90° C. At temperature, Charge 2 was added with mixing, then cooled to 40° C. with continued mixing. At 4° C., Charge 3 was added to the reactor over 5 minutes subsurface and rinsed with Charge 4. The reactor contents were then allowed to mix for 15 minutes, and the temperature was raised to 60° C. Charge 5, which was preheated to 90° C., was added to the reactor over a period of 40 minutes at an agitation rate of approximately 325 rpm. The mixture was then held at 60° C. and stirred for 60 minutes. The resulting dispersion was a thin white liquid, with a solids content (110° C., 1 hr) of 36.92%, and a viscosity (Brookfield #2 spindle, 100 rpm) of 45 cP. Particle size analysis (Malvem ZetaSizer 3000 HSa) showed a monomodal distribution with a Z average mean, number average, and volume average mean particle size of 278.6, 251.6, and 251.6 nm respectively.

Example 5

An aqueous dispersion of an acrylic macromonomer co-polymer and dibutyltin dilaurate with internal polymer was prepared from the following ingredients:

| Ingredient | Wt. in g |
| --- | --- |
| Charge 1 | |
| Acrylic macromonomer co-polymer/dibutyltin dilaurate dispersion of Ex. 4 | 208.6 |
| DI $H_2O$ | 10.0 |
| Charge 2 | |
| Ammonium persulfate | 0.12 |
| DI $H_2O$ | 10.0 |
| Charge 3 | |
| Styrene | 6.9 |
| Butyl methacrylate | 8.05 |
| Butyl acrylate | 8.05 |
| Charge 4 | |
| DI $H_2O$ | 5.0 |
| Charge 5 | |
| Ammonium persulfate | 0.05 |
| DI $H_2O$ | 4.0 |
| Charge 6 | |
| DI $H_2O$ | 4.0 |

Charge 1 was added to a 2 L round bottom flask equipped with a thermocouple, condenser, $N_2$ inlet and paddle blade stirrer, placed under an $N_2$ blanket, and heated to 75° C. At temperature, Charges 2 and 3 were added simultaneously over 3 hours. Upon completion of Charge 3, Charge 4 was added as a rinse and the reaction mixture was held for 1 hour. Charge 5 was then added to the reactor, followed by Charge 6 as a rinse, and the reaction mixture held for 1 hour. The resulting dispersion was a thin white liquid, with a solids content (110° C., 1 hr) of 32.6%, and a viscosity (Brookfield #2 spindle, 100 rpm) of 33 cP. Particle size analysis (Malvern ZetaSizer 3000 HSa) showed a monomodal distribution with a Z average mean, number average, and volume average mean particle size of 241.3, 207.5, and 211.7 nm respectively.

Coating Formulation Examples

Preparation of Coating Composition Containing Catalyst Dispersion Described in Example 3

(Formula A):

The following ingredients were added to a mixing cup: 38.8 g of a solventborne clearcoat identical in composition to DC4000 (a solventborne clearcoat commercially available from PPG Industries, Inc.), but with the variation of being prepared without catalyst, and 1.06 g of the catalyst dispersion from Example 3 were added together and mixed thoroughly by hand. Then 10.88 g of a solventborne dearcoat hardener identical in composition to DCH 3085 (solventborne clearcoat hardener commercially available from PPG Industries, Inc.) but with the variation of being prepared without catalyst, was added and mixed thoroughly by hand.

Preparation of Coating Composition Containing Catalyst Dispersion Prepared in Example 4

(Formula B):

The following ingredients were added to a mixing cup: 38.8 g of a solventborne clearcoat identical in composition to DC4000, but with the variation of being prepared without catalyst, and 1.7 g of the catalyst dispersion from Example 4 were added together and mixed thoroughly by hand. Then 10.88 g of a solventborne clearcoat hardener identical in composition to DCH 3085, but with the variation of being prepared without catalyst, was added and mixed thoroughly by hand.

Preparation of Coating Composition Containing Catalyst Dispersion Prepared in Example 5 (Formula C):

The following ingredients were added to a mixing cup: 38.8 g of a solventborne clearcoat identical in composition to DC4000, but with the variation of being prepared without catalyst, and 2.15 g of the catalyst dispersion from Example 5 were added together and mixed thoroughly by hand. Then 10.88 g of a solventborne clearcoat hardener identical in composition to DCH 3085, but with the variation of being prepared without catalyst, was added and mixed thoroughly by hand.

Similar preparations with no catalyst or free DBTDL as outlined in Table 1 were also prepared and evaluated and are represented as Comparative Examples 1 and 2 respectively.

TABLE 1

Coating formulation examples (mass in grams).

| Ingredient | Comparative 1 | Comparative 2 | A | B | C |
|---|---|---|---|---|---|
| DC 4000 | 38.8 | 38.8 | 38.8 | 38.8 | 38.8 |
| DBTDL | 0 | 0.35 | 0 | 0 | 0 |
| Example 3 | 0 | 0 | 1.05 | 0 | 0 |
| Example 4 | 0 | 0 | 0 | 1.70 | 0 |
| Example 5 | 0 | 0 | 0 | 0 | 2.15 |
| DCH 3085 | 10.88 | 10.88 | 10.88 | 10.88 | 10.88 |

To evaluate the effect of the catalyst dispersions on pot life, coating viscosity was measured over time. Konig pendulum hardness and dust-free time were measured after coating application to evaluate the effect of the catalyst dispersions on cure of the coating as applied to a substrate.

The formulas from the above examples were spray applied to electrocoated steel panels. The panels used were ACT cold rolled steel panels (10.16 cm by 30.48 cm) with ED6060 electrocoat available from ACT Laboratories, Inc. The coating compositions were each hand sprayed using a HVLP spray gun with a 1.4 mm nozzle at ambient temperature in two coats with an ambient flash between applications. Clearcoats were targeted for a 2 to 3 mils (about 51 to 76 micrometers) dry film thickness.

Some of the physical properties of the compositions are summarized below in Table 2:

TABLE 2

| Properties | | Comparative 1 | Comparative 2 | A | B | C |
|---|---|---|---|---|---|---|
| Viscosity[1] at time indicated (cP) | Initial | 43.5 | 24.4 | 32.9 | 27.1 | 27.7 |
| | 15 min | 44.4 | 49.2 | 44 | 43.5 | 38.3 |
| | 30 min | 45.8 | 167.9 | 65.4 | 90.4 | 64.2 |
| | 45 min | 53.2 | gel | 136.0 | 200 | 131.2 |
| | 60 min | 55.6 | gel | gel | gel | 200 |
| | gel | 4+ hrs | 30-45' | 45-60' | 45-60' | 75' |
| Dust-free time | | 75' | 15' | 15' | 15' | 15' |
| 24 hr Konig | | 13 | 44 | 54 | 45 | 43 |

[1] Measured on Brookfield CAP 2000 viscometer with #1 spindle at 900 RPM.
[2] The time at which no cotton fibers adhere to the coating surface after placing a cotton ball on the surface. Measured at 15 min intervals.

It can be seen from the viscosity measurements over time that use of the catalyst dispersions described in Examples 3-5 significantly extends the pot life of the formula as compared to the traditional free catalyst of the Comparative 2 formula. Upon spray application, the dust-free time and Konig hardness of coatings using the catalyst dispersions is comparable to the free catalyst system and significantly better than the no catalyst system of Comparative 1. Use of the catalyst dispersions described in Examples 3-5 above allows for the novel combination of extended pot-life while maintaining the dust-free time and hardness of a traditionally catalyzed system to be realized.

The present invention further contemplates an additive composition comprising:
  (a) at least 1 percent by weight, or at least 5 percent by weight, or at least 30 percent by weight of an additive compound based on the total weight of solids in the additive composition; and
  (b) a polymer prepared from ethylenically unsaturated monomers, wherein: (i) the polymer has a backbone derived from substantially hydrophilic monomers and/or monomers containing groups that may be rendered substantially hydrophilic after polymerization and a plurality of side chains along the backbone derived from substantially hydrophobic monomers, or
  (ii) the polymer has a backbone derived from substantially hydrophobic monomers and a plurality of side chains along the backbone derived from substantially hydrophilic monomers and/or monomers containing groups that may be rendered substantially hydrophilic after polymerization; and wherein the additive compound is contained within or encapsulated by the polymer.

Such additives may be any that impart desired properties to the curable composition to which they are added, provided the additive is capable of being encapsulated. Exemplary additives include a lubricant, an indicator, an antimicrobial composition, a UV light absorber, a corrosion inhibitor, or other desired additive useful in curable compositions.

Whereas particular embodiments of this invention have been described above for purposes of illustration, it will be evident to those skilled in the art that numerous variations of the details of the present invention may be made without departing from the invention as defined in the appended claims. It is understood, therefore, that this invention is not limited to the particular embodiments disclosed, but it is intended to cover modifications that are within the spirit and scope of the invention, as defined by the appended claims.

What is claimed is:

1. A catalyst composition comprising:
  (a) at least 30 percent by weight of a catalyst compound based on the total weight of solids in the catalyst composition; and
  (b) a polymer prepared from ethylenically unsaturated monomers, wherein: (i) the polymer has a backbone derived from substantially hydrophilic monomers and/or monomers containing groups that may be rendered substantially hydrophilic after polymerization, and a plurality of side chains along the backbone derived from substantially hydrophobic monomers, or
  (ii) the polymer has a backbone derived from substantially hydrophobic monomers and a plurality of side chains along the backbone derived from substantially hydrophilic monomers and/or monomers containing groups that may be rendered substantially hydrophilic after polymerization;
  and wherein the catalyst compound is contained within or encapsulated by the polymer.

2. The catalyst composition of claim 1, wherein the catalyst compound (a) comprises an organotin compound.

3. The catalyst composition of claim 1, wherein the catalyst composition is dispersed in an aqueous medium.

4. The catalyst composition of claim 1, wherein the substantially hydrophobic monomers include one or more of n-butyl (meth)acrylate, isobutyl (meth)acrylate, lauryl (meth) acrylate, 2-ethylhexyl (meth) acrylate, stearyl (meth) acrylate, and styrene.

5. The catalyst composition of claim 1, wherein the substantially hydrophilic monomers include one or more of methoxypolyethylene glycol (meth)acrylate, hydroxyethyl (meth)acrylate, hydroxypropyl (meth)acrylate, 4-hydroxybutyl (meth)acrylate, hydroxy functional adducts of caprolactone and hydroxyalkyl (meth)acrylates, (meth)acrylic acid, crotonic acid, itaconic acid, maleic acid and fumaric acid.

6. The catalyst composition of claim 1, wherein the catalyst compound comprises an organo-metal catalyst compound and the polymer (b) demonstrates a glass transition temperature less than 15° C.

7. The catalyst composition of claim 1, further comprising (c) an additional polymer different from the polymer (b), wherein the catalyst compound and the additional polymer (c) are contained within or encapsulated by the polymer (b).

8. A curable composition comprising:
  a) a reaction mixture comprising:
    i) one or more resins having reactive functional groups that are reactive with themselves; or
    ii) a crosslinking agent and one or more resins having reactive functional groups that are reactive with functional groups on the crosslinking agent; and
  b) the catalyst composition of claim 1.

9. The curable composition of claim 8, wherein the catalyst composition b) is present in the resin component and/or the crosslinking agent component of the reaction mixture.

10. A method of preparing a catalyst composition of claim 1 dispersed in an aqueous medium, comprising:
  i) polymerizing together one or more substantially hydrophobic, ethylenically unsaturated monomers to yield a substantially hydrophobic macromonomer having an ethylenically unsaturated end group that is polymerizable with other ethylenically unsaturated monomers;
  ii) polymerizing together one or more substantially hydrophilic ethylenically unsaturated monomers, and/or monomers containing groups that are rendered substantially hydrophilic after polymerization, with the macromonomer formed in step i) to yield a polymer having a substantially hydrophilic backbone and a plurality of substantially hydrophobic side chains along the backbone;
  iii) combining the polymer with an aqueous medium;
  iv) optionally neutralizing any acid or base groups on the polymer;
  v) dispersing the polymer into the aqueous medium;
  vi) adding a catalyst compound to the aqueous medium; and
  vii) dispersing the catalyst compound into the aqueous medium to form a dispersed catalyst composition comprising the catalyst compound contained within or encapsulated by the polymer.

11. The method of claim 10, wherein polymerization in step i) is conducted at a temperature of 170° to 300° C.

12. The method of claim 10, wherein two or more of steps iii) to vii) or two or more of the steps i) to v) are performed simultaneously.

13. The method of claim 10, wherein the catalyst compound is added to the aqueous medium after the polymer is dispersed into the aqueous medium.

14. The method of claim 10, wherein the catalyst compound and polymer are dispersed into the aqueous medium simultaneously to form a dispersed catalyst composition comprising the catalyst compound encapsulated by the polymer.

15. The method of claim 10, wherein the substantially hydrophobic ethylenically unsaturated monomers include one or more of n-butyl (meth)acrylate, isobutyl (meth)acrylate, lauryl (meth)acrylate, 2-ethylhexyl (meth) acrylate, stearyl (meth) acrylate, and styrene.

16. The method of claim 10, wherein the substantially hydrophilic ethylenically unsaturated monomers include one or more of methoxypolyethylene glycol (meth)acrylate, hydroxyethyl (meth)acrylate, hydroxypropyl (meth)acrylate, 4-hydroxybutyl (meth)acrylate, hydroxy functional adducts of caprolactone and hydroxyalkyl (meth)acrylates, (meth) acrylic acid, crotonic acid, itaconic acid, maleic acid and fumaric acid.

17. The method of claim 10, wherein the catalyst compound comprises an organotin compound.

18. The method of claim 10, further comprising: viii) forming an additional polymer, different from the polymer formed in step ii), in the presence of the catalyst composition formed in step vii).

19. A method of preparing a catalyst composition of claim 1 dispersed in an aqueous medium, comprising:
  i) polymerizing together one or more substantially hydrophilic, ethylenically unsaturated monomers, and/or monomers containing groups that may be rendered substantially hydrophilic after polymerization, to yield a substantially hydrophilic macromonomer having an ethylenically unsaturated end group that is polymerizable with other ethylenically unsaturated monomers;
  ii) polymerizing together one or more substantially hydrophobic ethylenically unsaturated monomers with the macromonomer formed in step i) to yield a polymer having a substantially hydrophobic backbone and a plurality of substantially hydrophilic side chains along the backbone;
  iii) combining the polymer with an aqueous medium;
  iv) optionally neutralizing any acid or base groups on the polymer;
  v) dispersing the polymer into the aqueous medium;
  vi) adding a catalyst compound to the aqueous medium; and
  vii) dispersing the catalyst compound into the aqueous medium to form a dispersed catalyst composition comprising the catalyst compound contained within or encapsulated by the polymer.

20. The method of claim 19, wherein two or more of steps iii) to vii) or two or more of the steps i) to v) are performed simultaneously.

21. The method of claim 19, wherein polymerization in step i) is conducted at a temperature of 170° to 300° C.

22. The method of claim 19, wherein the catalyst compound is added to the aqueous medium after the polymer is dispersed into the aqueous medium.

23. The method of claim 19, wherein the catalyst compound comprises an organotin compound.

24. The method of claim 19, wherein the catalyst compound and polymer are dispersed into the aqueous medium simultaneously to form a dispersed catalyst composition comprising the catalyst compound encapsulated by the polymer.

25. The method of claim 19, further comprising: viii) forming an additional polymer, different from the polymer formed in step ii), in the presence of the catalyst composition formed in step vii).

* * * * *